United States Patent
Wolterman

(10) Patent No.: US 7,636,632 B2
(45) Date of Patent: Dec. 22, 2009

(54) INTELLIGENT NAVIGATION SYSTEM

(75) Inventor: Michael John Wolterman, Brighton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 671 days.

(21) Appl. No.: 11/148,684

(22) Filed: Jun. 9, 2005

(65) Prior Publication Data

US 2006/0282214 A1    Dec. 14, 2006

(51) Int. Cl.
G01C 21/30    (2006.01)
G01C 21/32    (2006.01)

(52) U.S. Cl. .................. 701/208; 701/200; 701/213; 701/210; 701/207; 701/117

(58) Field of Classification Search ................ 701/200
See application file for complete search history.

(56) References Cited

U.S. PATENT DOCUMENTS

| | | | | |
|---|---|---|---|---|
| 5,177,685 | A | * | 1/1993 | Davis et al. .............. 455/456.5 |
| 5,948,042 | A | * | 9/1999 | Heimann et al. ............ 701/208 |
| 6,047,234 | A | * | 4/2000 | Cherveny et al. ........... 701/200 |
| 6,154,152 | A | * | 11/2000 | Ito ............................. 340/988 |
| 6,163,750 | A | | 12/2000 | Nojima |
| 6,230,098 | B1 | | 5/2001 | Ando et al. |
| 6,233,520 | B1 | | 5/2001 | Ito et al. |
| 6,253,152 | B1 | | 6/2001 | Ito |
| 6,256,578 | B1 | | 7/2001 | Ito |
| 6,381,537 | B1 | * | 4/2002 | Chenault et al. ............ 701/209 |
| 6,516,273 | B1 | * | 2/2003 | Pierowicz et al. ........... 701/301 |
| 6,526,350 | B2 | | 2/2003 | Sekiyama |
| 6,581,004 | B2 | | 6/2003 | Mori et al. |
| 6,662,105 | B1 | | 12/2003 | Tada et al. |
| 6,711,473 | B2 | | 3/2004 | Shimazaki et al. |
| 6,721,654 | B2 | | 4/2004 | Akiyama |
| 2005/0102098 | A1 | * | 5/2005 | Montealegre et al. ....... 701/209 |

FOREIGN PATENT DOCUMENTS

| | | |
|---|---|---|
| JP | 2002243469 | 8/2002 |
| JP | 2004086363 | 3/2004 |

* cited by examiner

Primary Examiner—Khoi Tran
Assistant Examiner—Bhavesh V Amin
(74) Attorney, Agent, or Firm—Gifford, Krass, Sprinkle, Anderson & Citkowski, P.C.

(57) ABSTRACT

A system and method of intelligent navigation of a vehicle using a navigation system with artificial intelligence is provided. The system includes a global positioning means, a navigation means, a controller, and an information database containing a map of a location of a traffic control device. The method includes the steps of maintaining a map in an information database associated with the navigation system, and sensing a location of the vehicle using an input means in communication with the navigation system.

12 Claims, 3 Drawing Sheets

INTELLIGENT NAVIGATION SYSTEM

BACKGROUND OF THE INVENTION

1. Field of the Invention

The present invention relates generally to an intelligent navigation system, and more specifically, to a system and method of providing an intelligent navigation system that incorporates artificial intelligence.

2. Description of the Related Art

Intelligent navigation involves the delivery of information to a vehicle operator. Various types of information are useful for navigation purposes, including geographically related information such as maps, or points of interest, or the like. The information is communicated to the vehicle operator in a variety of ways, such as a display device or a screen integral with the instrument panel.

One feature of an intelligent navigation system is the integration of a global positioning system (GPS). The GPS system automatically determines the location of the vehicle. The GPS may be a hand-held device or integral with the vehicle. The global positioning system includes a signal transmitter, a signal receiver, and a signal processor. The GPS, as is known in the art, utilizes the concept of time-of-arrival ranging to determine position. The global positioning system includes a signal receiver in communication with a space satellite transmitting a ranging signal. The position of the signal receiver can be determined by measuring the time it takes for a signal transmitted by the satellite at a known location to reach the signal receiver in an unknown location. By measuring the propagation time of signals transmitted from multiple satellites at known locations, the position of the signal receiver can be determined. NAVSTAR GPS is an example of a GPS that provides worldwide three-dimensional position and velocity information to users with a receiving device from twenty-four satellites circling the earth twice a day.

Another feature of a navigation system is a digital map. The digital map is an electronic map stored in an associated computer database. The digital map may include relevant information about a particular map location, such as intersections, curves, hills or the like. It may also include information about a traffic control device. The digital map can be extremely useful to the vehicle operator. However, maps are dynamic due to factors like the addition of new roads, traffic condition shifts, or road construction. Therefore, it is difficult and expensive to accurately maintain a digital map database.

At the same time, most vehicle operators repeatedly travel the same routes within their geographic area. As a vehicle operator becomes accustomed to a particular route, the vehicle operator may tend to react automatically to traffic control devices along the route. This behavior can be dangerous, especially if there is a change to a traffic control device.

Thus, there is a need in the art for an intelligent navigation system that incorporates artificial intelligence in order to provide the operator with accurate information about traffic control devices along frequently traveled routes.

SUMMARY OF THE INVENTION

Accordingly, the present invention is a system and method of providing an intelligent navigation system that incorporates artificial intelligence. The system includes a global positioning means, a navigation means, a controller, and an information database containing a map of a location of a traffic control device.

The method includes the steps of maintaining a map in an information database associated with the navigation system, and sensing a location of the vehicle using an input means in communication with the navigation system. The method also includes the steps of determining if the sensed vehicle location is identifiable on the map maintained by the information database and updating the map using the sensed vehicle location if not identifiable; and determining if the vehicle is approaching an identifiable traffic control device using the map in the information database and the sensed vehicle location, if the sensed vehicle location is identifiable. The method further includes the steps of adaptively updating the map in the information database if determined that the vehicle is not approaching the identifiable traffic control device on the map in the information database and transmitting an alert message that the vehicle is approaching the identifiable traffic control device, if determined that the vehicle is approaching the identifiable traffic control device on the map in the information database.

One advantage of the present invention is that an intelligent navigation system that incorporates artificial intelligence is provided that alerts the vehicle operator to an upcoming traffic control device. Another advantage of the present invention is that a system and method of intelligent navigation that incorporates artificial intelligence is provided that is cost effective to implement. Still another advantage of the present invention is that a system and method of intelligent navigation that incorporates artificial intelligence is provided that utilizes adaptive learning to continuously update a map database. A further advantage of the present invention is that a system and method of intelligent navigation system that incorporates artificial intelligence is provided that includes a portable database.

Other features and advantages of the present invention will be readily appreciated, as the same becomes better understood after reading the subsequent description taken in conjunction with the accompanying drawings.

DESCRIPTION OF THE PREFERRED EMBODIMENT(S)

Figure 1:
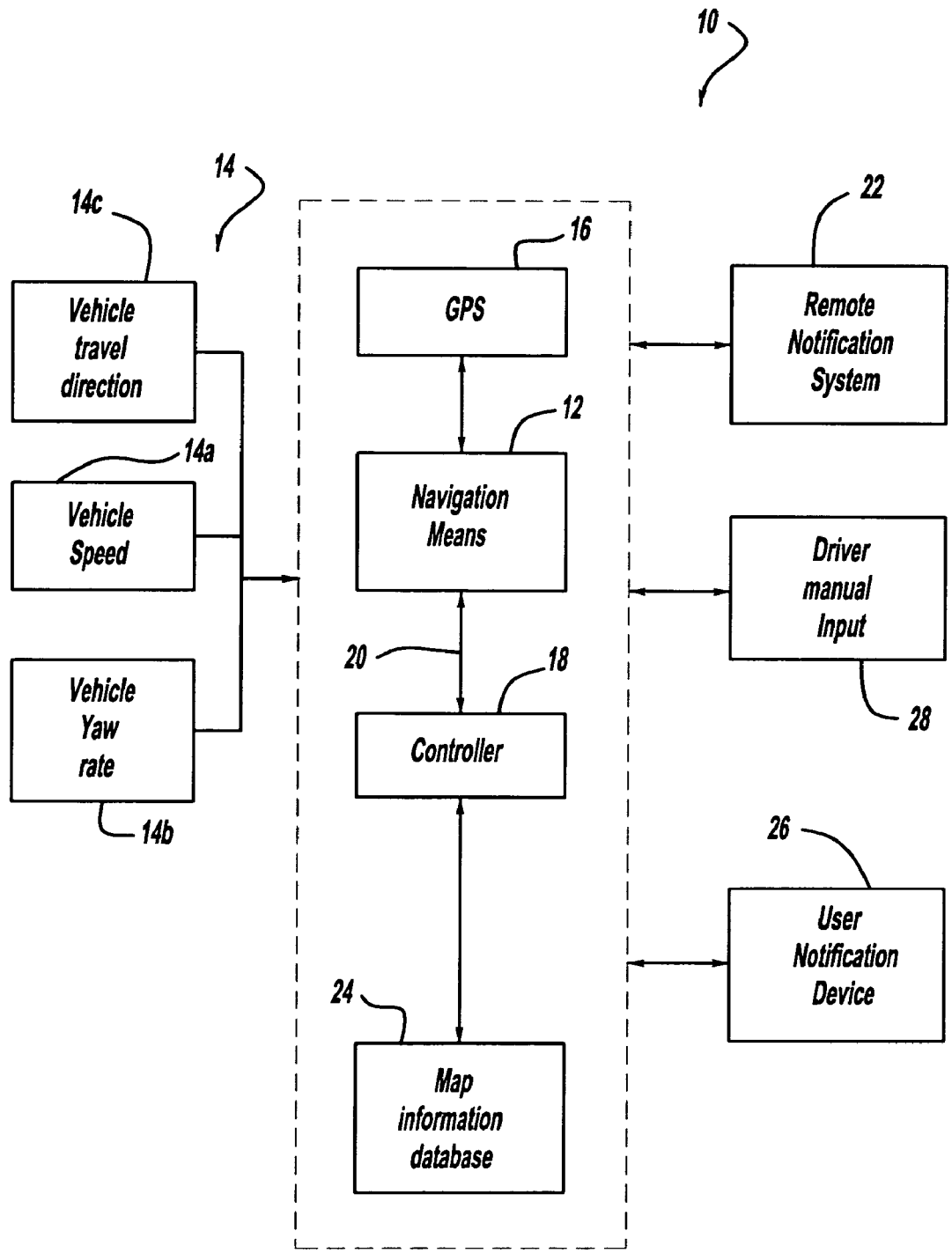
FIG. 1 is a block diagram of an intelligent navigation system with an artificial intelligence feature, according to the present invention.

Referring to FIG. 1, a system 10 of intelligent navigation using artificial intelligence is provided. In this example, the system 10 is integrated with an automotive vehicle, although it is contemplated that it can be utilized on other types of vehicles, such as boats or planes or trains. Further, it is anticipated that the system may be incorporated into a hand-held device. Various uses of the system are foreseeable beyond providing an indication of a traffic control device. For example, it can be utilized on a boat to warn that the boat is in a no-wake zone. Alternatively, it can be carried by a hiker to warn that there is a hazard in the path.

The system includes a navigation means 12. The navigation means 12 receives various vehicle inputs 14, and utilizes these inputs 14 in order to execute a predetermined navigation-related function. One example of a predetermined navigation function is correlation with information in a map database. The map database typically provides a vehicle operator with relevant geographic information, such as street address, points of interest, or directions.

The navigation means 12 monitors the actual geographic location of the vehicle. The geographic location is determinable using a global positioning system 16, or GPS. In this example, the GPS 16 is a global positioning receiver that is in communication with a global positioning system (not shown). The global positioning system is a satellite-based radio navigation system that provides global positioning and velocity determination. The GPS system includes a plurality of satellites strategically located in space that transmit a radio signal. The global positioning receiver 16 uses the signals from the satellites to calculate the location of the vehicle.

It should be appreciated that the global positioning receiver 16, in conjunction with the navigation means, may combine wireless communication with information transfer, between the vehicle and a central receiving location. In this example, the vehicle includes a signaling device that, when activated, transmits a signal to a central receiving location. The central receiving location analyzes the signal from the global positioning system in order to determine the vehicle location.

The system 10 further includes a controller operatively in communication with the navigation system via a communications link 20. The communications link 20 may be a wired connection, or wireless. One example of a wireless link is a universal shortwave connectivity protocol referred to in the art as BLUETOOTH. It should be appreciated that the controller 18 may operatively be in communication with a remotely located navigation system 22. For example, the controller 18 may transmit or receive a message regarding a traffic control device to or from a centralized navigation system in order to update the information contained within a map information database navigation device onboard the vehicle.

The controller 18 includes a processor. The artificial intelligence learning algorithm (to be described) is stored in a memory associated with the controller 18. The controller may be integral with the navigation means 12, or a separate device in communication with the navigation means 12. The memory is operatively in communication with the controller. The memory may be a permanent memory, or a removable memory module. An example of a removable memory is a memory stick or smart card, or the like. An advantage of a removable memory is the information learned by the system and stored on the memory module may be transferred to another vehicle. Advantageously, the removable memory accelerates the learning process for the new vehicle.

An information database is preferably maintained by the memory. The information database 24 contains data relevant to the navigation system, such as geographically related information. In this example, the information database 24 is a map database. In addition to the previously described map features, the map may contain information specific to a particular location or topological information such as curves in the road or hills. The map also identifies the location of traffic control devices. Various types of traffic control devices or traffic signals are commonly known. These include stop signs, yield signs, traffic lights, warning devices, or the like.

The system 10 further includes a user notification device 26 operatively in communication with the controller 18 via the communication link 20. One example of a user notification device 26 is a display screen. The display screen displays information relevant to the system and method. For example, the display screen displays a warning message. Another example of a user notification device is an audio transmission device that plays an audio message through speakers associated with an audio transceiver on the vehicle, such as the radio.

The system also includes a user manual input mechanism 28 which is operatively in communication with the controller via the communication link. The manual user input mechanism 28 can be a keypad or a touchpad sensor on the display screen, or a voice-activated input or the like. The manual user input mechanism allows the user to provide a manual input to the controller 18. The user input may be independent, or in response to a prompt on the display device. The manual user input mechanism 28 may advantageously be utilized to update the map stored in the information database 24 regarding the location of a traffic control device, such as a stop sign. For example, the vehicle operator may touch an icon on the display screen or press a key on the keypad to update the map when a traffic control device is encountered without warning. Alternatively, it can update the system when a warning is mistakenly provided to the user. Advantageously, the system 10 learns the location of traffic control devices more quickly as a result of the input of traffic control device information from the vehicle operator. This feature is especially beneficial on new routes, or less frequently traveled routes. The vehicle driver may also correct the traffic control device information stored in the map information database. For example, if the display device warns of a yield sign at a particular intersection based on previous driver behavior, and the yield sign is changed to a stop sign, the vehicle driver can manually update the map in the information database with this change.

The system 10 also receives various vehicle inputs 14 that are utilized in conjunction with the method to be described. The vehicle inputs 14 may be utilized in conjunction with the map data in the information database 24 to determine the occurrence of a condition which activates the global positioning receiver 16 to receive a signal from the global positioning system in order to determine the location of the vehicle from the signal transmitted by the global positioning system. The position of the vehicle is transmitted to the controller 18 and the controller 18 uses the information in various ways, such as to learn the location of a traffic control device, or to identify the geographic location of the vehicle, or to update the map stored in the information database. In addition, the vehicle inputs may be utilized to update data to the map in the information database. The system may then correlate key information with key points in the database, like road features such as curves, intersections or the like.

One example of an input signal is vehicle speed 14a. This can be measured by a speed sensor operatively in communication with the controller 18. The system can correlate the vehicle speed with the presence of the traffic control device. For example, the controller 18 can utilize vehicle speed to recognize that it always is reduced to zero at a particular intersection when traveling in a specific direction. In another example, it can use vehicle speed to recognize that the vehicle sometimes slows down at a particular location, or sometimes stops. From this information, the controller can infer that the intersection has a traffic signal, such as a stoplight. The vehicle can also record the amount of time the vehicle is stopped, which is another variable indicating the likelihood of a stoplight. The speed sensor can also be used to infer a speed limit, if the vehicle always travels a certain speed on a route.

Another example of an input signal is vehicle yaw rate 14b. This can be measured using a sensor in communication with the vehicle brake system. An example of a predetermined condition is the application of the brakes in conjunction with the vehicle speed dropping to zero for a predetermined period of time. This type of a situation would occur at a stop sign or a traffic light. A slowing down would occur at a yield sign or at a railroad crossing.

Still another example of an input is vehicle travel orientation 14c. This information can be obtained from a compass. Alternatively, vehicle travel orientation can be determined from the GPS 16.

Other relevant inputs may also be sensed, such as a light sensor, a time sensor, or a temperature sensor.

Advantageously, the navigation system can be removed from the vehicle and used outside the vehicle as an electronic travel reference guide. It should also be appreciated that the navigation system 10 may include an integrated wireless telecommunication means to provide the user with access to wireless communication. In addition, the system may communicate the updated map information to a remotely located centralized facility 22. This facility could then utilize the map information to update its own databases and communicate information to or from other vehicles. For example, this feature could be utilized to update the map information in a database in another vehicle equipped with an intelligent navigation system. This is beneficial to warn other drivers of situations, such as the presence of a new traffic control device, temporary road obstruction, or traffic delay, or the like.

Figure 2:
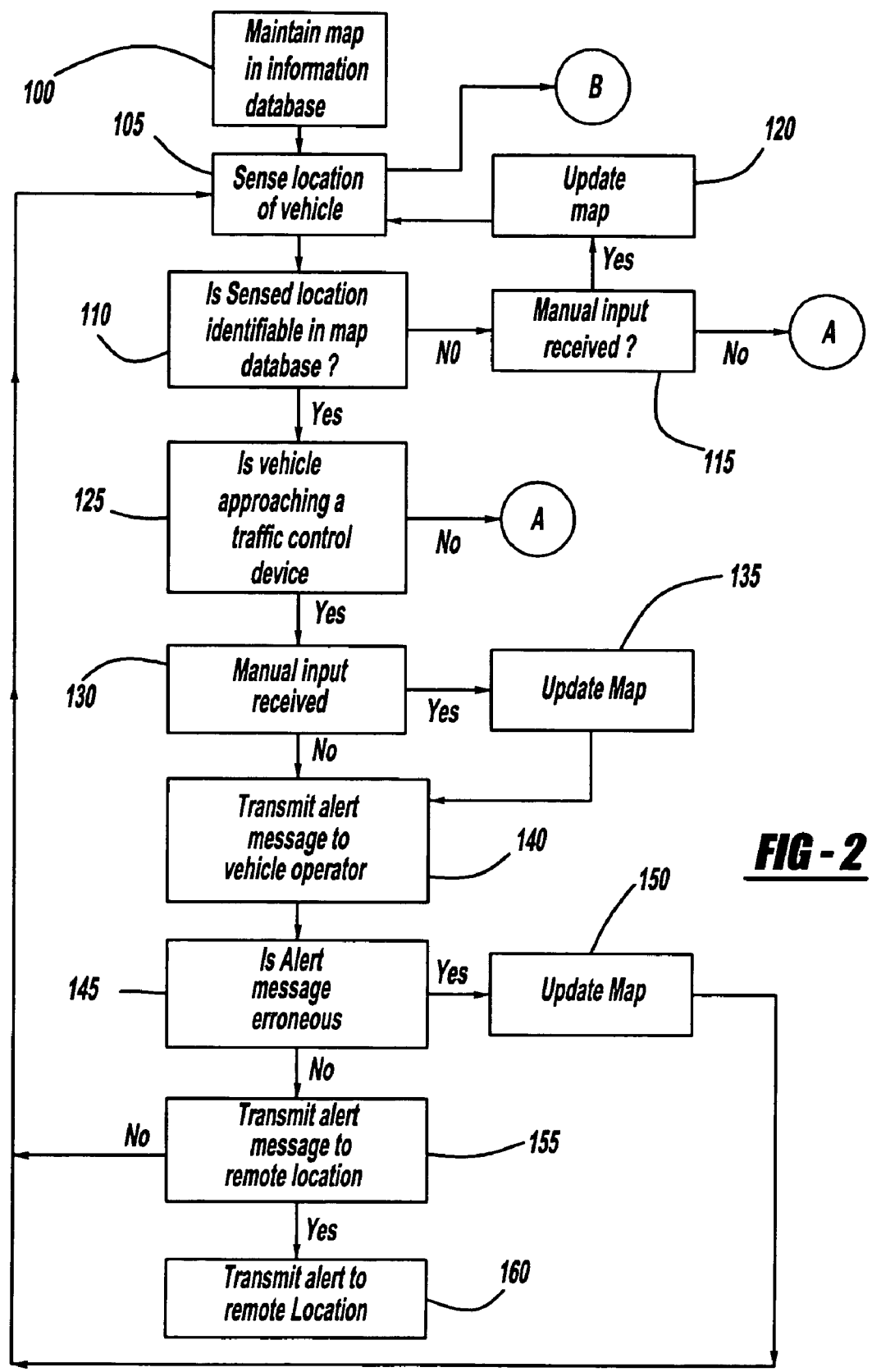
FIG. 2 is a flowchart of a method for intelligent navigation with an artificial feature using the system of FIG. 1, according to the present invention.

Referring to FIG. 2, a method of intelligent navigation using the navigation system 10 described with respect to FIG. 1 is illustrated.

The method begins in block 100 with the step of maintaining a map in the information database 24 associated with the controller 18. The map includes various types of navigational information, such as that regarding streets and addresses. The map also includes information regarding the presence of a traffic control device, the type of traffic control device, and the location of the traffic control device on the map. The method advances to block 105.

In block 105, the methodology determines the location of the vehicle, such as by sensing the position of the vehicle using one of the previously described inputs to the controller 18. For example, the GPS system 16 provides information to the controller 18 regarding the location of the vehicle. The methodology advances to block 110.

In block 110, the methodology determines if the sensed location of the vehicle is identifiable on the map maintained by the information database 24 associated with the controller. For example, the geographic coordinates of the sensed position of the vehicle can be compared to geographic coordinates on the map. If the sensed location is not identified, the methodology advances to block 115.

In block 115, the methodology determines if a manual input has been received from the operator indicating the presence of a traffic control means. For example, the operator may activate the user input mechanism 28 to send a signal to the controller 18 to update the map in the information database 24 regarding the presence of a traffic control means. The user input mechanism 28 may also be used to indicate the type of traffic control means. If a manual input has not been received, the methodology advances to circle A, which is described in FIG. 3, and continues. It should be appreciated that the methodology described with respect to FIG. 3 adaptively learns the presence of a traffic control means from the action of the vehicle.

Returning to block 115, if a manual input is received, the methodology advances to block 120. In block 120, the map maintained by the information database associated with the controller is updated with the user supplied information. The methodology returns to block 105 and continues to monitor the travel of the vehicle.

Returning to block 110, if the sensed location of the vehicle is identifiable using the map in the information database, the methodology advances to block 125. In block 125, the methodology determines if the vehicle is approaching a traffic control device using the identified vehicle location. For example, the identified vehicle location, the traffic control device location information within the map database, and the input signals representing the direction and speed of the vehicle may be utilized by the processor to determine if the vehicle is approaching a traffic control device.

Figure 3:
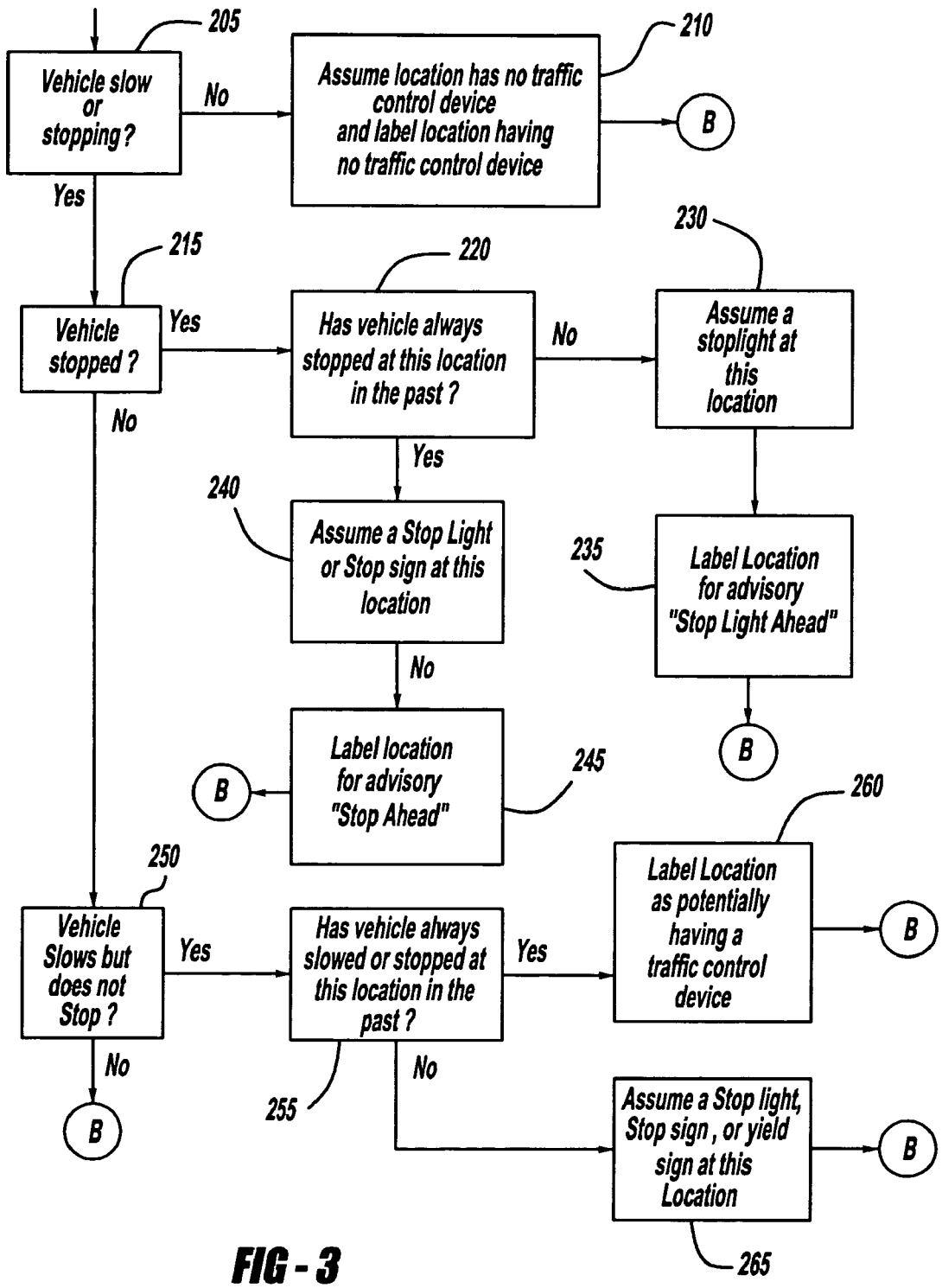
FIG. 3 is a flowchart for updating a digital map using an artificial intelligence learning feature, according to the present invention.

If determined from the information database that the vehicle is not approaching a traffic control device, the methodology continues to block A of FIG. 3 and adaptively updates the map in the information database, based upon the action of the vehicle.

If determined that the vehicle is approaching a traffic signal means, the methodology advances to block 130. In block 130 the methodology determines if a manual input has been received from the operator indicating the presence of a traffic control means. For example, the operator may activate the user input device to send a signal to the controller to update the map in the information database regarding the presence of a traffic control device. The user input device may also be used to indicate the type of traffic control device such as a stoplight or yield sign.

If a manual input has been received, the methodology advances to block 135 and updates the map database associated with the controller according to the user supplied information. The methodology advances to block 140 and continues.

In block 140, the methodology transmits a message to the vehicle operator using the user notification device to alert the vehicle operator regarding the approaching traffic control device. It is contemplated that the message can take various forms. For example, the message may be an audio signal such as a voice recording warning of a stop sign. Another example of a message is a written message, or icon regarding the traffic signal means, that is displayed on the display screen. The methodology advances to block 145.

In block 145, the methodology determines whether the alert message is erroneous. For example, the user may manually correct the alert message using a manual input means if the alert message is erroneous. This feature is especially advantageous if a traffic signal means has changed. If determined that the alert message is erroneous, the methodology advances to block 150.

In block 150, the methodology updates a map in the information database associated with the controller with the user supplied information. It should be appreciated that an input signal from the vehicle operator may be utilized to update the information database. The methodology returns to block 105 and continues with monitoring the travel of the vehicle.

Returning to block 145, if the alert message is not determined to be erroneous, the methodology advances to block 155. In block 155, the methodology determines if the alert message should be transmitted to a remote notification system. The remote notification system may be part of a centrally located traffic infrastructure, another vehicle or a remotely located database, a roadside communication means, or the like. If determined not to transmit the alert message to the remote notification system 22, the methodology returns to block 105 and continues to monitor the travel of the vehicle.

If determined to transmit the alert message to a remote notification system 22, the methodology advances to block 160. In block 160, the message is transmitted to a remote notification system 22 via a communication link. As previously described, the communications link may be a wireless communications link. The methodology returns to block 105 and continues to monitor the travel of the vehicle.

Referring to FIG. 3, the adaptive learning process begins in circle A at 200 and continues to block 205. In block 205, the methodology determines whether the vehicle is slowing down or stopping. For example, the vehicle input sensors 14, such as the speed sensor or the yaw sensor, can provide information regarding the speed of the vehicle or the application of the brakes. If determined that the vehicle is not slowing or stopping, the methodology advances to block 210.

In block 210, the map on the information database 24 is updated to indicate that the intersection does not have a traffic control device, such as a traffic signal. It should be appreciated that the map in the information database 24 is updated to indicate that there is no traffic control means at the intersection in the direction in which the vehicle is traveling. The methodology returns to block 105 of FIG. 2, and continues to monitor the travel of the vehicle.

Returning to block 205, if determined that the vehicle is slowing down or stopping, the methodology advances to block 215 and determines if the vehicle is stopped. The controller may utilize the vehicle input sensors 14 to determine if the vehicle is stopped. For example, a vehicle speed of zero mph for a predetermined period of time indicates that the vehicle is stopped.

If determined that the vehicle is stopped, the methodology advances to block 220 and determines if the vehicle has previously stopped at this location. In particular, it may be determined if the vehicle always stops at this location. Preferably, the location is identified using the map within the information database and the traffic control device information for the identified location in the map is utilized to determine if the vehicle has previously always stopped at the location.

If determined that the vehicle does not always stop in this location, the methodology advances to block 230. In block 230, the methodology assumes that there is a traffic control means at this intersection, and in particular a stoplight. The methodology advances to block 235, and the map in the information database is updated to indicate the potential presence of a traffic control device, and in particular a traffic light, at this identified location. The methodology returns to block 105 in FIG. 2 and continues to monitor the travel of the vehicle.

Returning to block 220, if determined that the vehicle always stops at this location, the methodology advances to block 240. In block 240, the methodology assumes that there is a stoplight or a traffic control means, such as a stop sign, at this identified location. The methodology advances to block 245, and the map in the information database 24 is updated to indicate the potential presence of a traffic control device, and in particular a stop sign, at this identified location. The methodology advances to circle B and returns to block 105 in FIG. 2 and continues to monitor the travel of the vehicle.

Returning to block 215, if determined that the vehicle is not stopped, the methodology advances to block 250. In block 250, the methodology determines if the vehicle is slowing but is not stopping. Preferably, information received by the vehicle input sensors is utilized to make this determination. If determined that the vehicle is not slowing, the methodology advances to circle B and returns to block 105 in FIG. 2 and continues to monitor the travel of the vehicle.

Returning to block 250, if determined that the vehicle is slowing but is not stopping, the methodology advances to block 255. In block 255 the methodology determines if the vehicle has previously slowed or stopped at this location in the past. For example, the methodology may utilize the information from the information database and the vehicle inputs to make this determination. If determined that the vehicle always slows or stops at this location in the past, the methodology advances to block 260. In block 260, the methodology assumes that there is a potential for the presence of a traffic control device at this location, and the map in the information database 24 is updated to indicate the potential presence of a traffic control device, and in particular a traffic light, at this location. The methodology advances to circle B and returns to block 105 in FIG. 2 and continues to monitor the travel of the vehicle.

Returning to block 255, if determined that the vehicle has previously slowed or stopped at this location, the methodology advances to block 265. In block 265, the methodology assumes that there is a traffic control device present at this intersection, and the map in the information database 24 is updated to indicate the presence of a traffic control device at this location. In particular a traffic light, stop sign or yield sign may be present at this location. The methodology advances to circle B and returns to block 105 in FIG. 2 and continues to monitor the travel of the vehicle.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A method of intelligent navigation of a vehicle using a navigation system with artificial intelligence, said method comprising the steps of:

maintaining a map in an information database associated with the navigation system of the vehicle, wherein navigation system includes a global positioning means, a navigation means, and a controller, and the map includes a location of a traffic control device;

sensing a location of the vehicle using an input means in communication with the navigation system;

determining when the sensed vehicle location is identifiable on the map maintained by the information database and updating the map using the sensed vehicle location when not identifiable;

determining when the vehicle is approaching an identifiable traffic control device using the map in the information database and the sensed vehicle location, when the sensed vehicle location is identifiable;

adaptively updating the map in the information database with a potential presence of a traffic control device by determining when the vehicle is slowing or stopped, when determined that the vehicle is not approaching an existing identifiable traffic control device on the map in the information database; and transmitting an alert message that the vehicle is approaching the identifiable traffic control device, when determined that the vehicle is approaching the identifiable traffic control device on the map in the information database, wherein adaptively updating the map in the information database further comprises:

determining when the vehicle is stopped at the location of the vehicle, using the map in the information database to determine if the vehicle has previously stopped at the location, and updating the map in the information database that location has a stoplight, when the vehicle has not previously stopped at the identified vehicle location, and updating the map in the information database that the location may have a stoplight or stop sign, when the vehicle has previously stopped at the location.

2. A method as set forth in claim 1 further including the steps of:

periodically receiving a manual input from a driver manual input device indicating a location of a traffic control device; and updating the map in the information database with the location of the traffic control device.

3. A method as set forth in claim 1 wherein the alert message is transmitted via a driver notification device and identifies the identifiable traffic control means.

4. A method as set forth in claim 1 further including the steps of determining when the alert message is erroneous and updating the map stored in the information database when the alert message is erroneous, after said step of transmitting an alert message to the vehicle operator.

5. A method as set forth in claim 1 further including the steps of determining whether to transmit the alert message to a remote navigation notification system and transmitting the alert message to the remote navigation notification system to update a map in a remotely located information database regarding the location of the identifiable traffic control means.

6. A method as set forth in claim 1 wherein said step of adaptively updating the map in the information database further includes the steps of:

determining when the vehicle is slowing or stopping and updating the map in the information database that the identified vehicle location does not have a traffic control device, when the vehicle is not slowing or stopping; and determining when the vehicle is slowing but not stopping when determined that the vehicle is not stopped, and determining if the vehicle has previously slowed or stopped at the identified location and updating the map in the information database that the identified vehicle location potentially has a traffic control device when determined that the vehicle has previously stopped at the identified vehicle location, and updating the map in the information database that the identified vehicle location has stoplight, stop sign or yield sign, when determined that the vehicle has not previously stopped at the identified vehicle location.

7. A method of intelligent navigation of a vehicle using a navigation system with artificial intelligence, said method comprising the steps of:

maintaining a map in an information database associated with the navigation system of the vehicle, wherein navigation system includes a global positioning means, a navigation means, and a controller, and the map includes a location of a traffic control device;

sensing a location of the vehicle using an input means in communication with the navigation system;

determining when the sensed vehicle location is identifiable on the map maintained by the information database and updating the map using the sensed vehicle location when not identifiable;

determining when the vehicle is approaching an identifiable traffic control device using the map in the information database and the sensed vehicle location, when the sensed vehicle location is identifiable;

adaptively updating the map in the information database when determined that the vehicle is not approaching the identifiable traffic control device on the map in the information database by:

determining when the vehicle is slowing or stopping and updating the map in the information database that the identified vehicle location does not have a traffic control device, when the vehicle is not slowing or stopping;

determining when the vehicle is stopped when determined that the vehicle is slowing or stopping, and using the map in the information database to determine when the vehicle has previously stopped at the identified vehicle location, and updating the map in the information database that the identified vehicle location has a stoplight, when determined that the vehicle has not previously stopped at the identified vehicle location or updating the map in the information database that the identified vehicle location may have a stoplight or stop sign at the identified location, when determined that the vehicle has previously stopped at the identified vehicle location; and determining when the vehicle is slowing but not stopping when determined that the vehicle is not stopped, and determining if the vehicle has previously slowed or stopped at the identified location and updating the map in the information database that the identified vehicle location potentially has a traffic control device when determined that the vehicle has previously stopped at the identified vehicle location, and updating the map in the information database that the identified vehicle location has stoplight, stop sign or yield sign, when determined that the vehicle has not previously stopped at the identified vehicle location;

transmitting an alert message that the vehicle is approaching the identifiable traffic control device, when determined that the vehicle is approaching the identifiable traffic control device on the map in the information database.

8. A method as set forth in claim 7 further including the steps of:

periodically receiving a manual input from a drive manual input device indicating a location of a traffic control device; and updating the map in the information database with the location of the traffic control device.

9. A method as set forth in claim 7 wherein the alert message is transmitted via a driver notification device and identifies the identifiable traffic control means.

10. A method as set forth in claim 7 further including the steps of determining when the alert message is erroneous and updating the map stored in the information database when the alert message is erroneous, after said step of transmitting an alert message to the vehicle operator.

11. A method as set forth in claim 7 further including the steps of determining whether to transmit the alert message to a remote navigation notification system and transmitting the alert message to the remote navigation notification system to update a map in a remotely located information database regarding the location of the identifiable traffic control means.

12. An intelligent navigation system for a vehicle using with artificial intelligence comprising:

a global positioning means;

a navigation means in communication with the global positioning means;

a controller in communication with said navigation means;

an information database associated with the controller, wherein said information database includes a map identifying a location of a traffic control device;

an input means for sensing a location of the vehicle that is in communication with said navigation means;

an alert means for transmitting an alert message to the vehicle operator; and wherein the controller includes an intelligent navigation computer program that:

determines when the sensed vehicle location is identifiable on the map maintained by the information database and updates the map using the sensed vehicle location when not identifiable;

determines when the vehicle is approaching an identifiable traffic control device using the map in the information database and the sensed vehicle location, if the sensed vehicle location is identifiable;

adaptively updates the map in the information database with a potential presence of a traffic control device by determining when the vehicle is slowing or stopped, when determined that the vehicle is not approaching an existing identifiable traffic control device on the map in the information database; and transmits the alert message that the vehicle is approaching the identifiable traffic control device, when determined that the vehicle is approaching the identifiable traffic control device on the map in the information database, wherein adaptively updating the map in the information database further comprises:

determining when the vehicle is stopped at the location of the vehicle, using the map in the information database to determine if the vehicle has previously stopped at the location, and updating the map in the information database that location has a stoplight, when the vehicle has not previously stopped at the identified vehicle location, and updating the map in the information database that the location may have a stoplight or stop sign, when the vehicle has previously stopped at the location.

* * * * *

UNITED STATES PATENT AND TRADEMARK OFFICE
CERTIFICATE OF CORRECTION

PATENT NO. : 7,636,632 B2 Page 1 of 1
APPLICATION NO. : 11/148684
DATED : December 22, 2009
INVENTOR(S) : Michael John Wolterman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 955 days.

Signed and Sealed this

Ninth Day of November, 2010

David J. Kappos
*Director of the United States Patent and Trademark Office*